US008670069B2

(12) United States Patent
Sjoberg et al.

(10) Patent No.: US 8,670,069 B2
(45) Date of Patent: Mar. 11, 2014

(54) IMAGING DEVICE HAVING AN ANGLE ADJUSTING DEVICE FOR AN IMAGE SENSOR

(75) Inventors: Magnus Sjoberg, Lomma (SE); Fredrik Sterngren, Lund (SE)

(73) Assignee: Axis AB, Lund (SE)

( * ) Notice: Subject to any disclaimer, the term of this patent is extended or adjusted under 35 U.S.C. 154(b) by 65 days.

(21) Appl. No.: 13/350,271

(22) Filed: Jan. 13, 2012

(65) Prior Publication Data

US 2012/0182471 A1    Jul. 19, 2012

Related U.S. Application Data

(60) Provisional application No. 61/433,779, filed on Jan. 18, 2011.

(30) Foreign Application Priority Data

Jan. 13, 2011   (EP) ..................................... 11150825

(51) Int. Cl.
*H04N 5/225* (2006.01)
*H04N 5/232* (2006.01)
*G02B 7/02* (2006.01)

(52) U.S. Cl.
USPC ............ 348/374; 348/345; 348/373; 359/823

(58) Field of Classification Search
USPC ......... 348/180, 187, 345, 373, 374, 294, 335, 348/340; 359/819, 823; 396/144
See application file for complete search history.

(56) References Cited

U.S. PATENT DOCUMENTS

| 5,689,738 | A | * | 11/1997 | Uziie et al. ...................... 396/79 |
| 5,966,249 | A | * | 10/1999 | Aoki .............................. 359/699 |
| 6,788,891 | B1 | * | 9/2004 | Mitsugi .......................... 396/144 |
| 7,557,852 | B2 | * | 7/2009 | Hashimoto et al. ........... 348/335 |
| 2001/0005288 | A1 | * | 6/2001 | Hayashi et al. ................ 359/826 |
| 2005/0168846 | A1 | * | 8/2005 | Ye et al. ......................... 359/819 |
| 2007/0182825 | A1 | | 8/2007 | Nomura et al. |
| 2007/0221821 | A1 | * | 9/2007 | Feldman .................... 250/201.1 |
| 2010/0060781 | A1 | * | 3/2010 | Yumiki et al. ................. 348/345 |
| 2010/0232161 | A1 | * | 9/2010 | Aschwanden et al. ........ 362/278 |
| 2011/0058804 | A1 | * | 3/2011 | Ito et al. ........................ 396/439 |

FOREIGN PATENT DOCUMENTS

| GB | 2 420 927 | | 6/2006 | |
| JP | 2002-357755 | | 12/2002 | |
| JP | 2003-222924 | | 8/2003 | |
| JP | 2003222924 | A * | 8/2003 | ............... G03B 5/08 |
| JP | 2005043494 | A * | 2/2005 | ............... G02B 7/02 |

OTHER PUBLICATIONS

European Search Report dated May 26, 2011 issued in European Application No. 11150825.5, filed Jan. 13, 2011.

* cited by examiner

*Primary Examiner* — Nhan T Tran
*Assistant Examiner* — Xi Wang
(74) *Attorney, Agent, or Firm* — Oblon, Spivak, McClelland, Maier & Neustadt, L.L.P.

(57) ABSTRACT

The present invention relates to a digital camera which comprises a sensor holder on which an image sensor is mounted and at least one adjustment ring. The adjustment ring is configured to rotate around an optical axis (OA) of the camera. The sensor holder and the at least one adjustment ring are configured to interact via at least one cam surface such that when the at least one adjustment ring is rotated with respect to the sensor holder, a normal direction of the sensor is adjusted in relation to a direction of the optical axis.

19 Claims, 7 Drawing Sheets

IMAGING DEVICE HAVING AN ANGLE ADJUSTING DEVICE FOR AN IMAGE SENSOR

CROSS-REFERENCE TO RELATED APPLICATIONS

This application claims the benefit of priority under 119(e) of U.S. Provisional Application No. 61/433,779, filed Jan. 18, 2011, and also claims the benefit of priority under 35 U.S.C. §119 to European Patent Application No. 11150825.5, filed Jan. 13, 2011, the entire contents of both of which are incorporated herein by reference.

TECHNICAL FIELD

The present invention relates to a camera comprising an adjustable image sensor.

BACKGROUND

In digital cameras and the like it is important to have an optimal positional relation between a lens and an image sensor. This would include having optimal back focal distance, the distance from the rear-most lens of the lens system to the sensor image plane. An error in this back focal distance with as little as 0.01 mm would give an image with poor focus.

Another important factor is the angle of the image sensor in relation to the optical axis of the lens system. The image sensor is typically mounted within a sensor holder. This holder can be of plastic or may be, as is common, a circuit board on which the image sensor is mounted. The light sensitive plane of the image sensor should ideally be perpendicular to the optical axis of the lens system in order to provide optimal quality image. This is however difficult to achieve for instance due to set mechanical tolerances within the different parts of the camera system.

Figure 8:
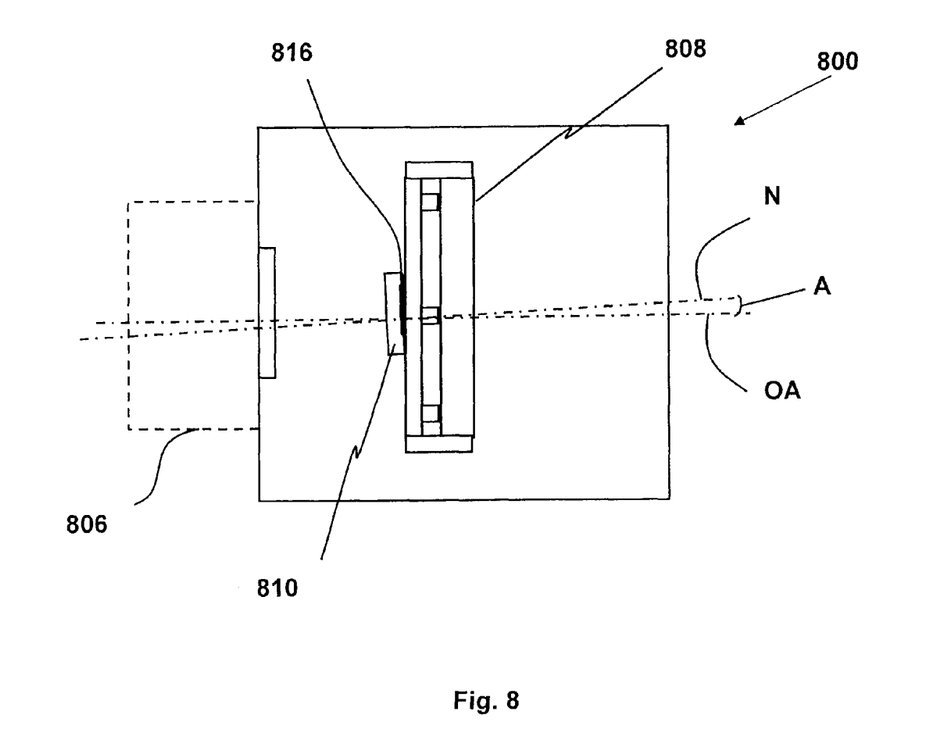
FIG. 8 illustrates the mounting of an image sensor within a sensor holder in a cross sectional view.

FIG. 8 shows an image sensor 810 mounted within a holder 808 with a mounting substance 816. The image sensor is not perpendicular to the optical axis as indicated by the angle A between the normal direction N of the light sensitive plane of the image sensor and the optical axis OA.

SUMMARY

An object of the invention is therefore to overcome at least some of the above mentioned drawbacks. The object is achieved by means of a digital camera according to claim 1. Further embodiments of the invention are presented in the dependent claims. In particular, according to a first aspect of the present invention, the object is achieved by means of a digital camera comprising a sensor holder on which an image sensor is mounted and at least one adjustment ring being configured to rotate around an optical axis (OA) of the camera, wherein the sensor holder and the at least one adjustment ring are configured to interact via at least one cam surface such that when the at least one adjustment ring is rotated with respect to the sensor holder, a normal direction of the sensor is adjusted in relation to a direction of the optical axis.

According to another embodiment the camera further comprises at least two adjustment rings, concentrically arranged with respect to each other. This embodiment may save space and may result in a mechanically favorable construction.

In another embodiment the at least one cam surface is included in the sensor holder. In a further embodiment the at least one cam surface is arranged on the adjustment ring.

According to another embodiment the interaction between the adjustment ring and the sensor holder is performed by means of at least two reading heads. In one embodiment at least one reading head is located at the front of the sensor holder and at least one reading head is located at the back of the sensor holder. In another embodiment at least one cam surface is arranged at the front of the sensor holder and at least one cam surface is arranged at the back of the sensor holder.

In a further embodiment the at least one cam surface is arranged on the periphery of the at least one adjustment ring.

In yet another embodiment comprises a first adjustment ring and a second adjustment ring wherein the first adjustment ring is configured to be rotated independently of the second adjustment ring giving the possibility to adjust the misalignment angle in different directions independently.

According to another embodiment the camera comprising a lens system, wherein the at least one cam surface has a cam profile, the cam profile being selected so that the distance between a point of the light sensitive surface of the image sensor that falls within the optical axis of the lens system and the lens system remains constant during the rotation of the at least one adjustment ring. This embodiment may give a system where the back focal distance is unchanged during the misalignment adjustment.

In a further embodiment the sum of the movement of the at least two reading heads in the direction of the optical axis is zero. Also this embodiment may lead to constant back focal distance during the adjustment.

In one particular embodiment the selected cam surface type is shaped as a cylinder cut off at an angle.

Further the cam surfaces may be implemented as grooves in the curved wall of the adjustment ring or the sensor holder.

In yet another embodiment the at least one adjustment ring comprises a rotation lock arrangement for locking the adjustment ring in relation to the sensor holder.

BRIEF DESCRIPTION OF THE DRAWINGS

In the following, a number of embodiments of the invention will be described referring to the following figures:

FIG. 2 (a, b, c) illustrate a digital camera having multiple cam surfaces in a cross sectional view.

FIG. 3 (a, b) illustrate different cam surface types.

FIG. 4 (a, b) illustrate grooves in an adjustment ring.

FIG. 7 (a, b) shows a front view and a side view, respectively, of an adjustment ring having a cut cylinder cam surface type form.

DETAILED DESCRIPTION

FIG. 8 shows an image sensor 810 mounted within a sensor holder 808. The optical axis OA is an imaginary line that defines the path along which light propagates through the lens system 806. In the ideal situation the light sensitive plane of the image sensor is perfectly perpendicular to the optical axis OA of the lens system, i.e. the normal N of the light sensitive plane of the image sensor is parallel to said optical axis OA. However, due to production problems this is often not the case, as indicated in FIG. 8 by the misalignment angle A between the normal direction N of the light sensitive plane of the image sensor and the direction of the optical axis OA of the lens system.

Figure 1:
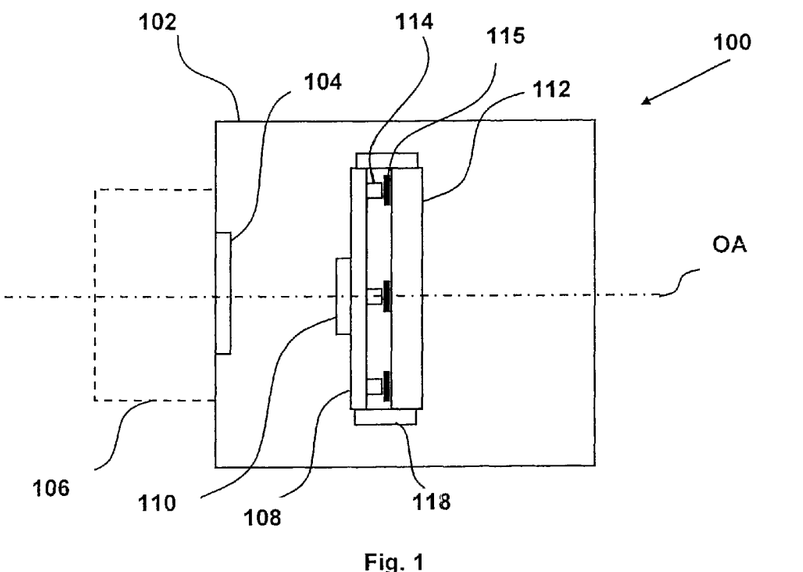
FIG. 1 shows a digital camera in a schematic cross sectional view.

FIG. 1 illustrates a housing 102 of a digital camera 100 with a lens mounting means 104 and a lens system 106. Inside the housing 102 there is a sensor holder 108 within which an image sensor 110 is mounted. Connected to the image sensor holder 108 is an adjustment ring 112. The sensor holder 108 and the adjustment ring 112 are configured to interact with each other via cam surfaces 115 and reading heads 114 through rotation around the optical axis. The interaction takes place at interaction points, being the points where the reading heads are in contact with the cam surface.

The cam surfaces 115 and the reading heads 114 are designed so that, when the adjustment ring 112 and the sensor holder 108 are rotated with respect to each other, the angle A between the normal direction N of the light sensitive plane of the image sensor and the optical axis OA of the lens system will be adjusted. Hence the adjustment will result in a change in tilt of the image sensor. One aim of this invention is to minimize the angle A. This adjustment is important particularly in view of current and future multi-megapixel sensors which have small pixels and therefore even a small misalignment of the image sensor becomes detrimental to the image quality.

The cam surfaces may either be arranged on the adjustment ring or included in the sensor holder and the corresponding reading heads may be arranged on, or included in, the other one of the adjustment ring or the sensor holder.

The cam surface has a cam profile with a certain shape, selected to ensure that the tilt of the light sensitive plane of the image sensor can be adjusted appropriately by rotation of the adjustment ring. During the rotation of the adjustment ring the reading heads follow the cam profile of the cam surface. This cam profile may have an inclination both in the direction of the rotation of the adjustment ring as well as perpendicular to this movement.

The cam surfaces may be arranged on the periphery of the adjustment ring, i.e. on the surface of the cylinder edge that is facing the sensor holder, as indicated in FIGS. 1, 2a-c, 3a-b, 5, 6 and 7a-b.

Figure 4A:
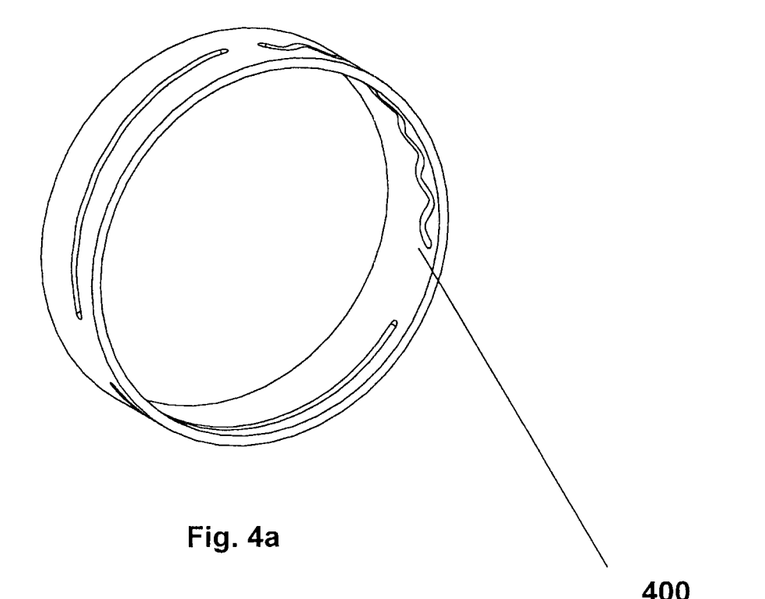
Figure 4B:
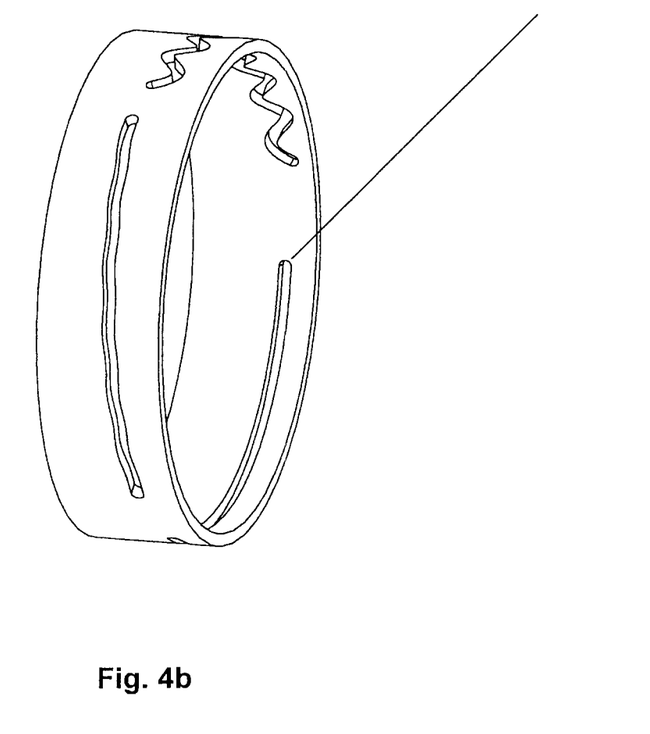

Alternatively the cam surfaces may be implemented as grooves in an adjustment ring wall as shown in FIGS. 4a and 4b showing different views. These grooves may be arranged on the outer surface or the inner surface of the ring. Alternatively the grooves may be arranged to penetrate the wall of the adjustment ring from the outer to the inner surface.

The adjustment of angle A, being the angle between the normal direction N of the light sensitive plane of the image sensor and the direction of the optical axis OA of the lens system, may be carried out in a single step typically by using a single adjustment ring. The number of the cam surfaces, the shape of their profiles and the position as well as the number of the reading heads are such that when the adjustment ring and the sensor holder are turned with respect to each other an optimum misalignment angle A may be found. In one embodiment the minimum value of the angle A is sought. Detailed embodiments of this single step approach will be described further on.

Alternatively the adjustment may be carried out in a two step approach typically by using two adjustment rings, independently rotatable. The cam surfaces and reading heads may be arranged so that the tilt of the sensor in the vertical direction is adjusted within a first step by turning the first adjustment ring and the sensor holder in relation to each other and so that the tilt of the sensor in the horizontal direction is adjusted within a second step by turning the second adjustment ring and the sensor holder in relation to each other. Also here the optimum misalignment angle A in both vertical and horizontal direction is sought, in one embodiment being the minimum value of angle A. Here the vertical tilting and the horizontal tilting of the sensor are adjusted apart. Detailed embodiments of this two step approach will also be detailed further on.

The two step approach may give advantages if the adjustment is being carried out manually as it may provide better control for the user. However with motorized and/or automated adjustment the single step adjustment may give a simpler implementation.

During the sensor adjustment it may in some cases be an advantage to ensure that the back focal distance, i.e. the distance between the point on the light sensitive plane of the image sensor that falls within the optical axis and the rearmost lens surface of the lens system, is kept constant. To achieve this, the total sum of the derivative of the cam profile in the interaction points, at any point in time, should be zero. The result is that the sum of the movement of the interaction points on the sensor holder, in the direction of the optical axis, is zero. These interaction points on the sensor holder may be either the reading heads or the cam surface, depending on which of the two is included in the sensor holder.

For a constant back focal distance in the two step approach, having two reading heads mounted at 180 degrees, the cam profiles of the cam surfaces may be chosen so that the second 180 degrees has the opposite derivative of the first part, e.g. when the two cam profiles are each other's mirrors.

In the single step approach constant back focus may also be achieved by carefully constructing the cam profiles of the cam surfaces.

If constant back focal distance is not required the profiles of the cam surfaces may be shaped freely so they achieve the needed range of the angle change with the least effort.

Embodiments with Single Step Adjustment Having a Single Adjustment Ring

Figure 3A:
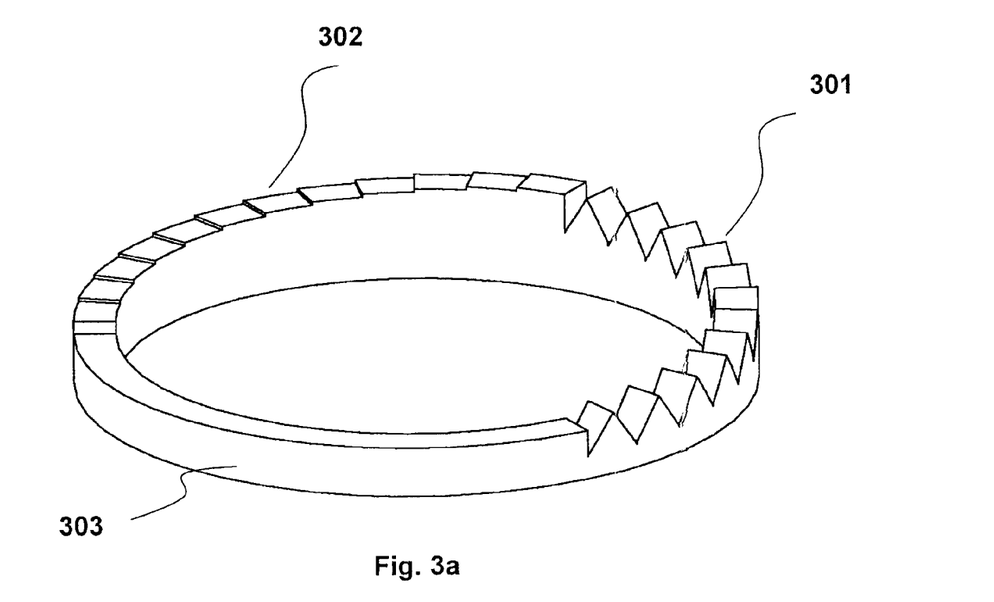

One embodiment, shown in FIG. 1, is a single step adjustment having a single adjustment ring 112. Three cam surfaces 115 and the corresponding three reading heads 114 may be mounted either on the adjustment ring or on the sensor holder 108. FIG. 3a illustrates an example of three cam surfaces 301, 302, 303 with 120 degrees between each other. The corresponding reading heads 114 would also be arranged at 120 degrees. The profile of the cam surface 115 would typically be selected so that when the adjustment ring 112 and the sensor holder 108 are turned with respect to each other an optimum misalignment angle A may be found.

To be able to use a 360 degrees cam surface per reading head, and thereby achieve a higher gearing than the previous embodiment, through higher resolution when the adjustment ring and the sensor holder are turned in relation to each other, several cam surfaces may be mounted concentrically with different radius on either the adjustment ring or the sensor holder. The reading heads are also here mounted on the other one of the adjustment ring or the sensor holder.

An embodiment with higher gearing would be an advantage if the adjustment is being carried out manually. However with motorized and automated adjustment the gearing may be of less importance and the previous embodiment, possibly with a considerably shorter cam surface, may be chosen.

Figure 5:
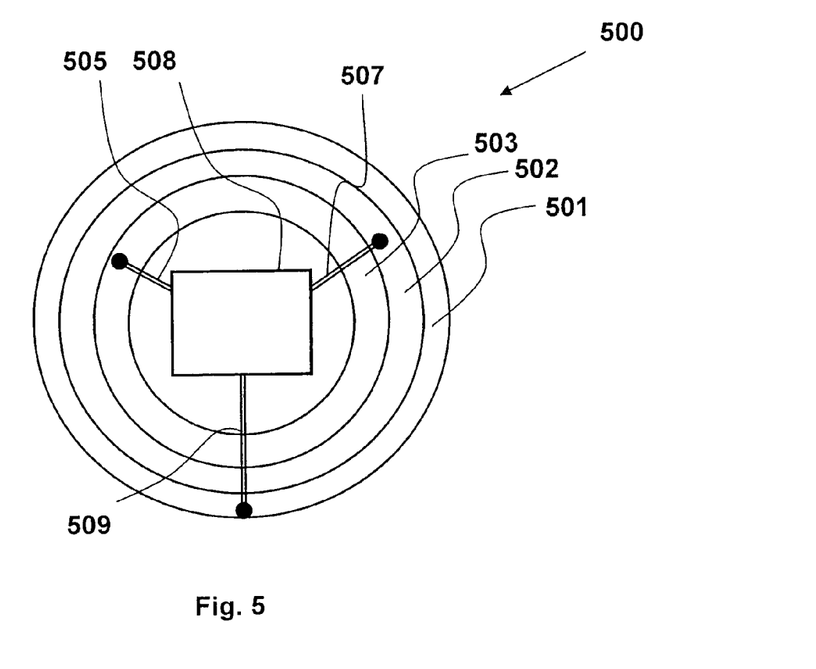
FIG. 5 shows a top view of an adjustment ring having three cam surfaces.

FIG. 5 shows one embodiment having these 360 degrees cam surface types. In this embodiment the single adjustment ring has three cam surfaces 501, 502 and 503 with different radius covering 360 degrees each. The arrangement has reading head holders 505, 507 and 509 typically mounted at 120 degrees. The reading head holders have one corresponding reading head each, mounted at the same radial distance as the corresponding cam surface so that the reading heads may read one cam surface each. As the previous embodiment, the adjustment is performed in a single step by turning the adjustment ring and the sensor holder in relation to each other.

Embodiments with Two Step Adjustment Having a Two Adjustment Rings

Figure 2A:
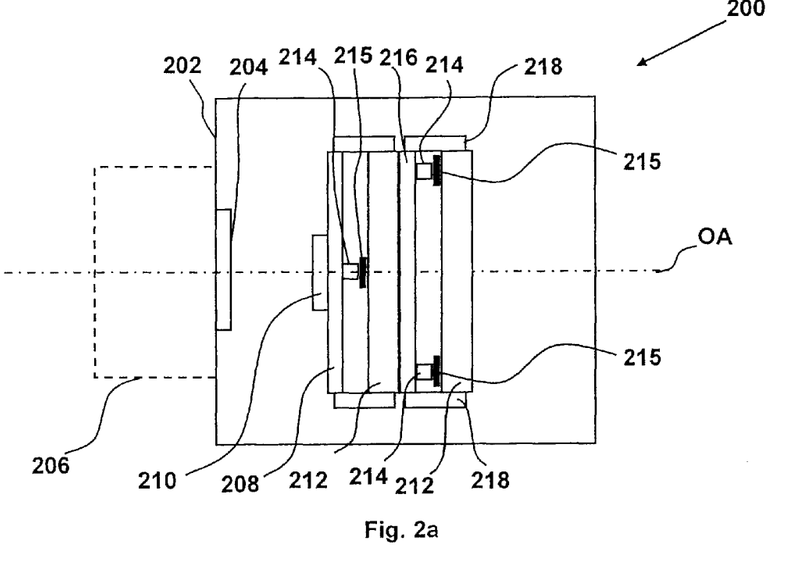
Figure 2B:
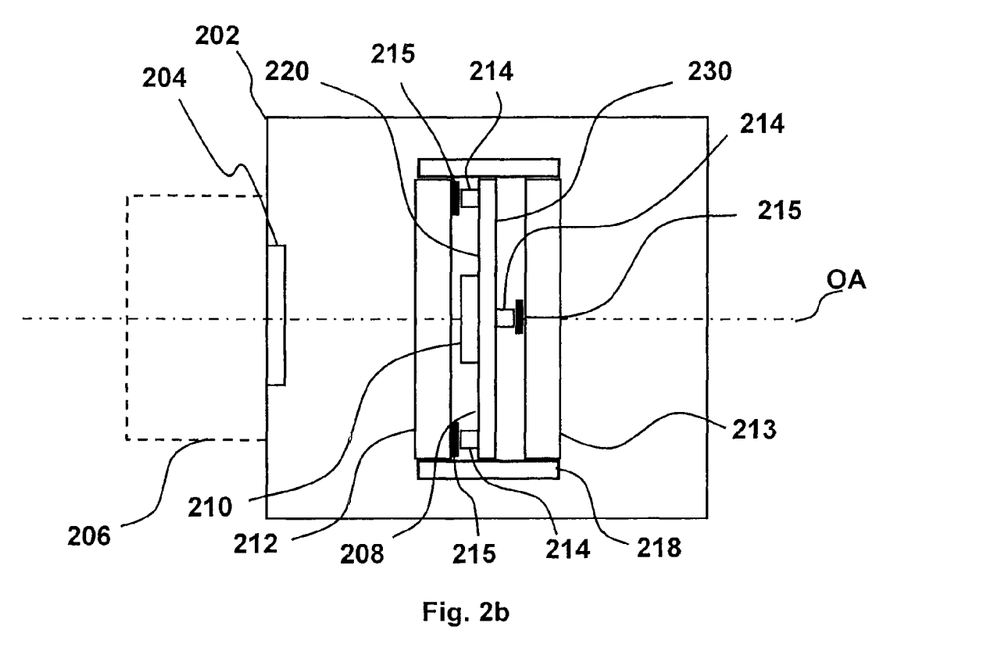
Figure 2C:
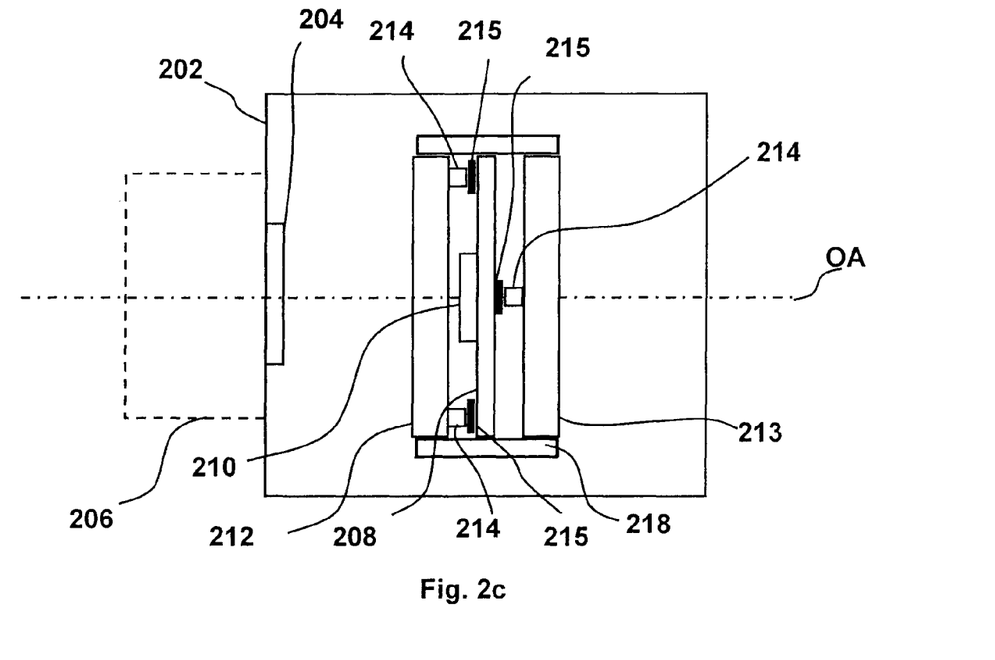

A further embodiment, illustrated in FIGS. 2a, 2b and 2c, comprises two adjustment rings 212 with the tilt of the sensor in the horizontal direction is adjusted by turning the first adjustment ring and the sensor holder in relation to each other and the tilt of the sensor in the vertical direction is adjusted by turning the second adjustment ring in relation to the sensor holder.

In FIG. 2a the two steps of the adjustment operation act serially in that the first adjustment ring interacts directly with the sensor holder and the second adjustment ring interacts with the first adjustment ring thereby adjusting the sensor holder.

In FIG. 2b the first adjustment ring is placed in front of the sensor holder and the second adjustment ring is placed behind the sensor holder. Both adjustment rings performs a direct adjustment of the sensor holder. In this example the reading heads 214 are mounted on the sensor holder 208 and hence the cam surfaces 215 are mounted on the adjustment rings.

In FIG. 2c, on the other hand, the reading heads 214 are mounted on the adjustment rings and the cam surfaces 215 on the sensor holder.

Figure 3B:
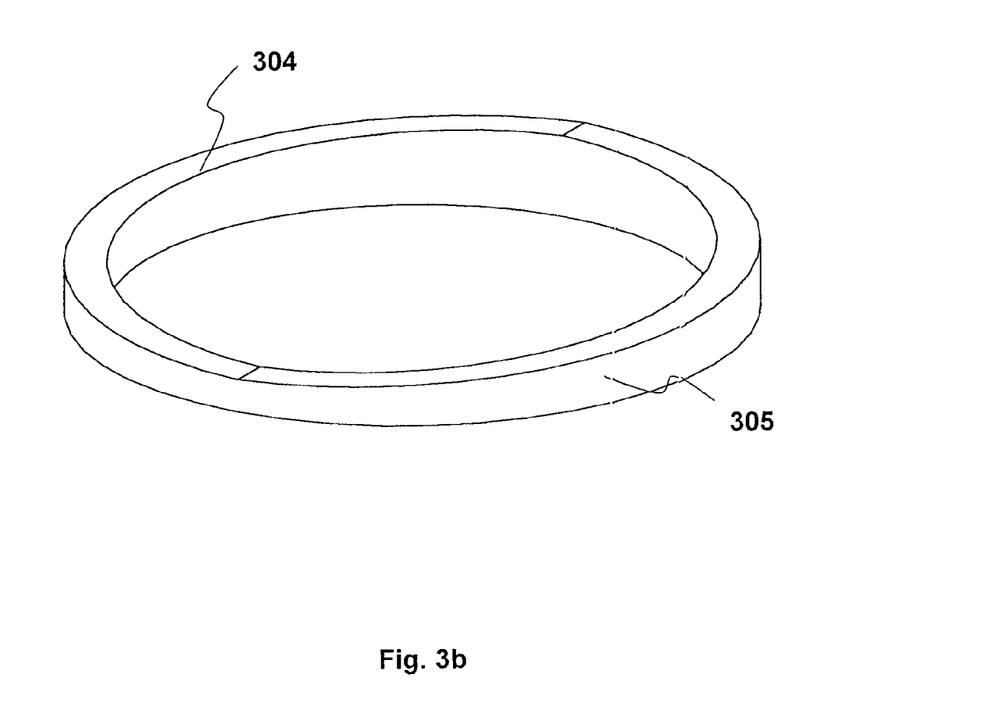

FIG. 3b illustrates an example of an adjustment ring having two 180 degree cam surfaces 304 and 305. Their chosen profiles have opposite derivative and the first profile is the mirror of the second. With the two reading heads mounted at 180 degrees a constant back focal distance will here be achieved.

Figure 7A:
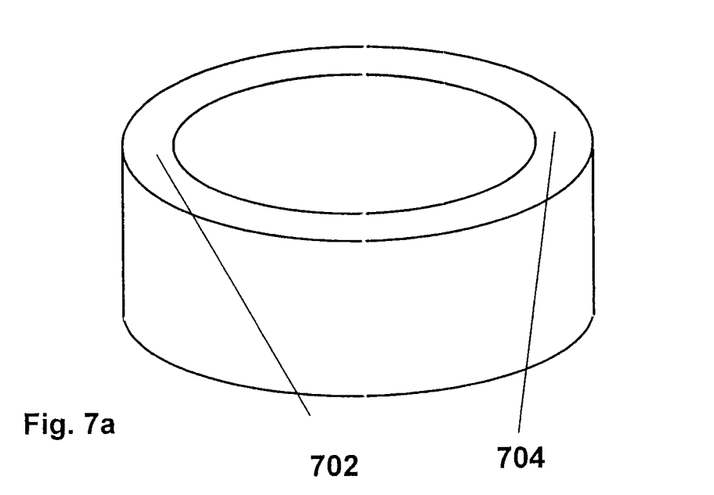
Figure 7B:
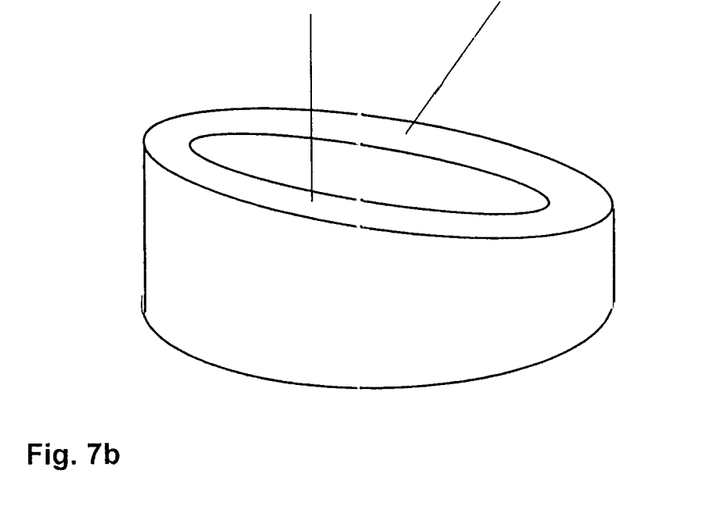

A further embodiment of the two step approach has a cam profile shaped as a cylinder cut off at an angle. FIGS. 7a and 7b illustrates different views of the cylinder when it has been cut off at an angle, giving the preferred cam profile type. This in effect gives a 360 degree continuous cam profile with two 180 degrees parts having opposite derivative. With the two reading heads placed at 180 degrees an adjustment with constant back focal distance will be achieved. The same 360 degree continuous cam profile is used once for the vertical adjustment of the sensor, when the first adjustment ring interacts with the sensor holder using the described cam profile type, and once for the horizontal adjustment of the sensor, when the second adjustment ring interacts with the sensor holder. The vertical and horizontal adjustment may be achieved by mounting the two cam surfaces and their respective two reading heads with a 90 degree shift between each other.

Figure 6:
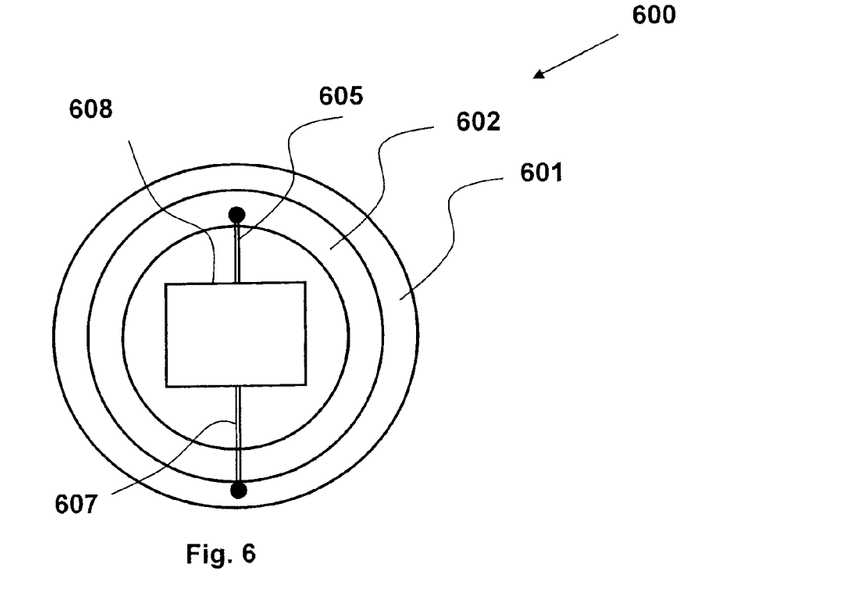
FIG. 6 shows a top view of an adjustment ring having two cam surfaces.

Also in the two step approach an embodiment may be used having a 360 degrees cam surface per reading head, giving higher gearing through higher resolution. This is illustrated in FIG. 6 where only the first of the two adjustment rings needed are shown. In this embodiment two 360 degrees cam surfaces 601 and 602, having different radius, are mounted either on the adjustment ring or the sensor holder. The arrangement comprises reading head holders 605 and 607 which are in this embodiment typically mounted 180 degrees apart. The reading head holder 605 and 607 have each a reading head arranged at the same radial distance as the corresponding cam surface. The reading heads may thereby read one cam surface each.

For all Above Mentioned Embodiments and any Further Embodiments, the Following Applies:

The adjustment of the normal direction of the light sensitive plane of the image sensor may include calibration before or after the use of the camera as well as dynamic adjustment and correction during use.

Apart from minimizing the misalignment angle A as described above, the presented arrangement may also be used to deliberately tilt the image sensor in any desired angle. This may be used to put a certain plane, not perpendicular to the optical axis of the lens system, in focus. An example would be fence monitoring.

The degrees of shift between reading heads, adjustment rings and cam surfaces may be different than those suggested in the embodiments. In motor driven adjustment, where lower gearing may be used, an embodiment with 3 reading heads being placed with 90 degrees apart may be implemented. Each corresponding cam curve may then also cover 90 degrees, or less, of the adjustment ring. The number of adjustment rings may be more than 3, for instance 4, with the corresponding number of reading heads.

The length of the cam surfaces chosen will typically depend on the needed gearing and may cover a full 360 degree circle, a half circle of 180 degrees or as mentioned earlier the cam surfaces may be both longer or shorter.

The mentioned adjustment of horizontal tilt and vertical tilt may be at any angle and not necessarily perpendicular to each other, nor to the optical axis of lens system. Also horizontal and vertical may be interpreted in a conventional manner rather than strictly scientific where the terms are defined in relation to the gravity field. In this sense the terms may be related to the camera housing and therefore be independent of how the camera is mounted or placed.

The adjustment rings may have the same diameter and be arranged with their centre after each other along an axis in the same general direction as the optical axis, and/or they may have different diameter and be placed concentrically, within each other and having the same centre point.

In one embodiment the centre point of the ring(s) of cam surfaces is placed in the plane of the sensor surface, as this makes it possible to keep the vertical and horizontal position of the sensor during the adjustment.

In another embodiment the interaction plane between the adjustment ring and the sensor holder should be located in the same plane as the light sensitive surface plane of the image sensor as this makes it possible to keep the vertical and horizontal position of the sensor during the adjustment. One method to achieve this is to place the reading heads at the sensor holder and mount the cam surfaces on the adjustment ring.

The invention described may be applied also to other types of sensors, such as position, angle, acoustic, magnetic, thermal and pressure sensors.

FIGS. 1 and 2 shows a rotation lock arrangement 118, 218. This may be part of the adjustment rings 112, 212, or in some embodiments be a part of the sensor holder 108, 208 or any holder 216 of cam surfaces. This rotation lock arrangement 118, 218 locks the adjustment rings 112, 212 and sensor holder 108, 208 or any holder 216 from rotating and thereby fixing the adjustment of the sensor 110, 210. An example of locking device may be one or several plastic springs which engage the rotating adjustment ring so that it is locked when the plastic spring is not pressed and free to rotate when the plastic spring is pressed. The adjustment ring may typically have cogwheel type slits where the plastic spring gets trapped when released and there by locks the ring from rotating. As shown in FIG. 2, in the two step approach two separate lock arrangements 218 may be implemented.

Alternatively, and especially in the case of initial calibration before use of the camera, the adjusted position may be permanently locked using an adhesive, e.g. glue, or any other types of fixing methods.

Different types of calculations and/or detection methods may be used to define when the image sensor is calibrated to an optimum angle, typically when the angle A has reached a minimum value. Examples on such methods are:

reflection calculation by use of laser
image processing
machine vision inspection of sensor surface.

The invention claimed is:

1. A digital camera comprising:
a lens system;
a sensor holder on which an image sensor is mounted; and
at least one adjustment ring configured to rotate around an optical axis of the camera,
wherein the sensor holder and the at least one adjustment ring are configured to interact via at least one cam surface such that when the at least one adjustment ring is rotated with respect to the sensor holder, a normal direction of the image sensor is adjusted in relation to a direction of the optical axis of the camera, and
wherein the at least one cam surface has a cam profile, the cam profile being selected so that a distance between the lens system and a point of a light sensitive surface of the image sensor that falls within an optical axis of the lens system remains constant during rotation of the at least one adjustment ring.

2. The camera of claim 1, wherein the at least one adjustment ring includes at least two adjustment rings, concentrically arranged with respect to each other.

3. The camera of claim 2, wherein the at least one adjustment ring includes a first adjustment ring and a second adjustment ring, the first adjustment ring being configured to rotate independently of the second adjustment ring.

4. The camera of claim 2, wherein the at least one cam surface is included in the sensor holder.

5. The camera of claim 2, wherein the at least one cam surface is arranged on the at least one adjustment ring.

6. The camera of claim 2, wherein the at least one adjustment ring and the sensor holder interact via at least two reading heads.

7. The camera of claim 2, wherein the at least one cam surface is arranged at a front of the sensor holder and a second cam surface is arranged at a back of the sensor holder.

8. The camera of claim 2, wherein the at least one cam surface is arranged on a periphery of the at least one adjustment ring.

9. The camera of claim 1, wherein the at least one cam surface is included in the sensor holder.

10. The camera of claim 9, wherein the at least one adjustment ring includes a first adjustment ring and a second adjustment ring, the first adjustment ring being configured to rotate independently of the second adjustment ring.

11. The camera of claim 1, wherein the at least one cam surface is arranged on the at least one adjustment ring.

12. The camera of claim 1, wherein the at least one adjustment ring and the sensor holder interact via at least two reading heads.

13. The camera of claim 12, wherein at least one reading head is located at a front of the sensor holder and at least one reading head is located at a back of the sensor holder.

14. The camera of claim 12, wherein a sum of movement of the at least two reading heads in the direction of the optical axis is zero.

15. The camera of claim 1, wherein the at least one cam surface is arranged at a front of the sensor holder and a second cam surface is arranged at a back of the sensor holder.

16. The camera of claim 1, wherein the at least one cam surface is arranged on a periphery of the at least one adjustment ring.

17. The camera of claim 1, wherein the selected cam profile is shaped as a cylinder cut off at an angle.

18. The camera of claim 1, wherein the at least one cam surface is a groove in a curved wall of the at least one adjustment ring or the sensor holder.

19. The camera of claim 1, wherein the at least one adjustment ring includes a rotation lock arrangement to lock the at least one adjustment ring in relation to the sensor holder.

* * * * *